United States Patent
Lee et al.

(10) Patent No.: US 6,918,562 B2
(45) Date of Patent: Jul. 19, 2005

(54) DEVICE FOR COMBINING ELECTRONIC APPLIANCES AND DISPLAYING APPARATUSES EMPLOYING THE SAME

(75) Inventors: You-sub Lee, Kunpo (KR); Young-tae Kim, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 10/261,598

(22) Filed: Oct. 2, 2002

(65) Prior Publication Data

US 2003/0141422 A1 Jul. 31, 2003

(30) Foreign Application Priority Data

Jan. 25, 2002 (KR) .......................................... 2002-4519

(51) Int. Cl.⁷ ................................................. A47F 5/02
(52) U.S. Cl. .................... 248/130; 248/291.3; 248/923; 248/361; 248/681
(58) Field of Search ................................ 248/130, 917, 248/918, 919, 922, 923, 291.1, 398, 371, 558, 126; 361/681, 682; 16/340, 337; 403/365, 112, 113, 114, 115, 116, 117, 351

(56) References Cited

U.S. PATENT DOCUMENTS

| | | | | |
|---|---|---|---|---|
| 5,190,258 A | * | 3/1993 | Yu | 248/279.1 |
| 5,454,745 A | * | 10/1995 | Spielberger | 446/71 |
| 5,801,793 A | | 9/1998 | Faris et al. | |
| 5,812,368 A | * | 9/1998 | Chen et al. | 361/681 |
| 5,825,613 A | | 10/1998 | Holden | |
| 5,850,998 A | * | 12/1998 | Parsey et al. | 248/223.21 |
| 5,852,545 A | * | 12/1998 | Pan-Ratzlaff | 361/683 |
| 6,018,847 A | * | 2/2000 | Lu | 16/337 |
| 6,323,902 B1 | * | 11/2001 | Ishikawa | 348/373 |
| 6,378,830 B1 | * | 4/2002 | Lu | 248/278.1 |
| 6,419,196 B1 | * | 7/2002 | Sweere et al. | 248/276.1 |
| 6,671,927 B2 | * | 1/2004 | Chen | 16/339 |
| 6,688,572 B2 | * | 2/2004 | Huang et al. | 248/291.1 |
| 2003/0122046 A1 | * | 7/2003 | Huong | 248/291.1 |
| 2003/0155472 A1 | * | 8/2003 | Lu et al. | 248/201 |
| 2003/0197101 A1 | * | 10/2003 | Lin | 248/130 |

FOREIGN PATENT DOCUMENTS

| | | | | |
|---|---|---|---|---|
| DE | 29918202 U1 | * | 12/1999 | ............. G09F/9/35 |
| JP | 4-44778 | | 4/1992 | |
| JP | 07212681 A | * | 8/1995 | ............. H04N/5/64 |
| JP | 2001-51750 | | 2/2001 | |
| KR | 20-0151047 | | 4/1999 | |
| KR | 20-0167230 | | 11/1999 | |
| KR | 20-0168704 | | 11/1999 | |
| KR | 2000-0072965 | | 12/2000 | |

* cited by examiner

*Primary Examiner*—Ramon O Ramirez
(74) *Attorney, Agent, or Firm*—Staas & Halsey LLP

(57) ABSTRACT

A coupling device for a displaying apparatus and electronic appliances which comprises a base member having a mounting part, positioned on an installation surface; and a monitor main body having a plurality of movable mounting parts detachably combined relative to the mounting part of the base member. With this configuration, the displaying apparatus can be easily adapted for a table-mounted type displaying apparatus or a wall-mounted type displaying apparatus.

28 Claims, 18 Drawing Sheets

DEVICE FOR COMBINING ELECTRONIC APPLIANCES AND DISPLAYING APPARATUSES EMPLOYING THE SAME

CROSS-REFERENCE TO RELATED APPLICATIONS

This application claims the benefit of Korean Application No. 2002-4519, filed Jan. 25, 2002, in the Korean Patent Office, the disclosure of which is incorporated herein by reference.

BACKGROUND OF THE INVENTION

1. Field of the Invention

The present invention relates in general to displaying apparatuses, and more particularly, to a displaying apparatus, which can be easily adapted for table mounting or for wall mounting.

2. Description of the Related Art

A conventional displaying apparatus 101, as shown in FIG. 1, comprises a monitor body 110 displaying pictures thereon and a base member 120 supporting the monitor body 110.

A connecting part 140 formed with a plurality of pass holes 140a on a planar surface of the connecting part 140 stands up on a center of the base member 120. Screws 130 are inserted into the pass holes 140a formed on the connecting part 140 and engaged into a rear surface of the monitor body 110, thereby coupling the monitor body 110 with the base member 120.

As illustrated in FIG. 1, the displaying apparatus 101 is installed on a table or a desk with the base member 120 seated thereon (so called a table-mounted type displaying apparatus). However, the displaying apparatus 101 can be used such that a monitor thereof is only installed on a wall (so called a wall-mounted type displaying apparatus) as depicted in FIG. 2.

To install the conventional displaying apparatus 101 as the wall-mounted type, displaying apparatus, as shown in FIG. 2, the screws 130 engaged into the rear surface of the monitor body 110 need to be disengaged to remove the base member 120 from the monitor body 110. Thereafter, the displaying apparatus 101 can be mounted on the wall with a supporting device 150 separately provided, as shown in FIG. 2.

Therefore, to use the conventional displaying apparatus 101 as a wall-mounted type displaying apparatus, a separate supporting device 150 should be provided, and the screws 130, which are engaged into the rear surface of the monitor body 110 should be removed one by one, thereby making the displaying apparatus 101 inconvenient to use as a wall-mounted type displaying apparatus.

Further, separate, auxiliary devices such as loudspeakers, etc., cannot be installed on the monitor body 110 of the conventional displaying apparatus 101. In this regard, the displaying apparatus 101 requires a wider space for installation of auxiliary devices, if the displaying apparatus 101 is installed as a table-mounted type displaying apparatus. If the displaying apparatus 101 is installed as a wall-mounted type displaying apparatus, a separate fixing unit (not shown) may be further provided to fix the auxiliary devices.

Further, this problem arising from attachment of the separate auxiliary devices to a monitor body is not limited only to displaying apparatuses but extended to all kinds of electronic appliances (for example, audio sets, TV sets, etc.).

SUMMARY OF THE INVENTION

The present invention provides a displaying apparatus which can be easily changed to a wall-mounted displaying apparatus type from a table-mounted type displaying apparatus, thereby providing increased convenience to users.

An object is to provide a displaying apparatus in which auxiliary devices can be easily attached to and detached from a monitor body.

A further object is to provide a coupling device for electronic appliances in which auxiliary devices can be easily attached to and detached from a main body thereof.

Additional objects and advantages of the invention will be set forth in part in the description which follows and, in part, will be obvious from the description, or may be learned by practice of the invention.

This and other objects of the present invention may be achieved by providing a displaying apparatus, comprising a base member having a mounting part, positioned on an installation surface; and a monitor main body having a plurality of movable mounting parts detachably combined relative to the mounting part of the base member.

Further, a displaying apparatus may comprise a base member having a first pass hole, positioned on an installation surface; a monitor main body having a plurality of second pass holes, selectively positioned relative to the first pass hole of the base member; and a rotatable coupling unit coupled with the first pass hole and the second pass holes, thereby rotatably coupling the monitor body at a predetermined angle relative to the base member.

Arc-shaped elongated holes may be formed around each of the second pass holes of the monitor body. The rotatable coupling unit may comprise a rotating member having a first boss, a main body part formed with a female screw provided coaxially with the first boss, and an extension rib, in combination with the main body part and movably disposed within the arc-shaped elongated holes according to a rotation of the monitor body, the rotating member being coupled to the second pass holes; and a coupling member having a head part, a shaft part formed with a male screw part engaged with a female screw of the main body part of the rotating member, being connected with the head part and inserted into the first pass hole, and a second boss provided to move axially to the shaft part, being fitted with the first boss.

The displaying apparatus may further comprise a disengagement-preventing nut combined with the main body part of the rotating member, thereby preventing the main body part from being disengaged from the second pass hole.

A plurality of washers may be positioned between the disengagement-preventing nut and the main body part.

The displaying apparatus may further comprise a bracket member detachably combining into both side walls within the monitor body, wherein the second pass holes are provided lengthwise to a bracket member at predetermined intervals.

A plurality of flanges formed with second pass holes may be provided in the bracket member, and a plurality of screw-coupling parts may be provided on one side wall within the monitor body so as to be screw-coupled with the pass holes of the flanges.

The base member may comprise a base part positioned on an installation surface and a pair of stand parts standing up on opposite sides of the base part and each formed with the first pass hole on one end thereof.

A bolt-inserting hole, into which a bolt screw-coupled into the installation surface is inserted, may be formed in the base part.

Into the bolt-inserting hole may be provided a depressed part depressed from a planar surface of the base part.

A further cover member may be detachably provided into the depressed part.

The above and other objects may also be achieved by a displaying apparatus comprising a base member, a monitor body supported on the base member and an auxiliary device detachably combined to the monitor body, at least one pair of hook-receiving parts, being oppositely positioned to the monitor body and the auxiliary device; and a connection support member having free ends engaged into the hook-receiving parts, respectively, and supportably connecting the auxiliary device to the monitor body.

The displaying apparatus may further comprise first and second bracket members, respectively, detachably, combined, to the monitor body and the auxiliary device, and the hook-receiving parts being formed in the first and second bracket members, respectively.

The free end on one side of the connection supporting member may be screw-coupled into the hook-receiving part of the first bracket member and the free end on another side of the connect support member may be hook-coupled with the hook-receiving part of the second bracket member.

The connection supporting member may comprise first and second unit members coupled with each other by a ball joint.

A ball may be formed on one side of the first unit member, and a ball housing freely and rotatably supporting the ball may be formed on one side of the second unit member.

The above and other objects may further be achieved by a coupling device for electronic appliances including a main body and an auxiliary device coupled to the main body, comprising first and second bracket members detachably combined with the main body and the auxiliary device, respectively, formed with hook-receiving parts opposite to each other on the planar surface thereof; and a connection supporting member having both free ends which are respectively engaged into the hook-receiving parts of the first and second bracket members, respectively, and supportably connecting the auxiliary device to the main body.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
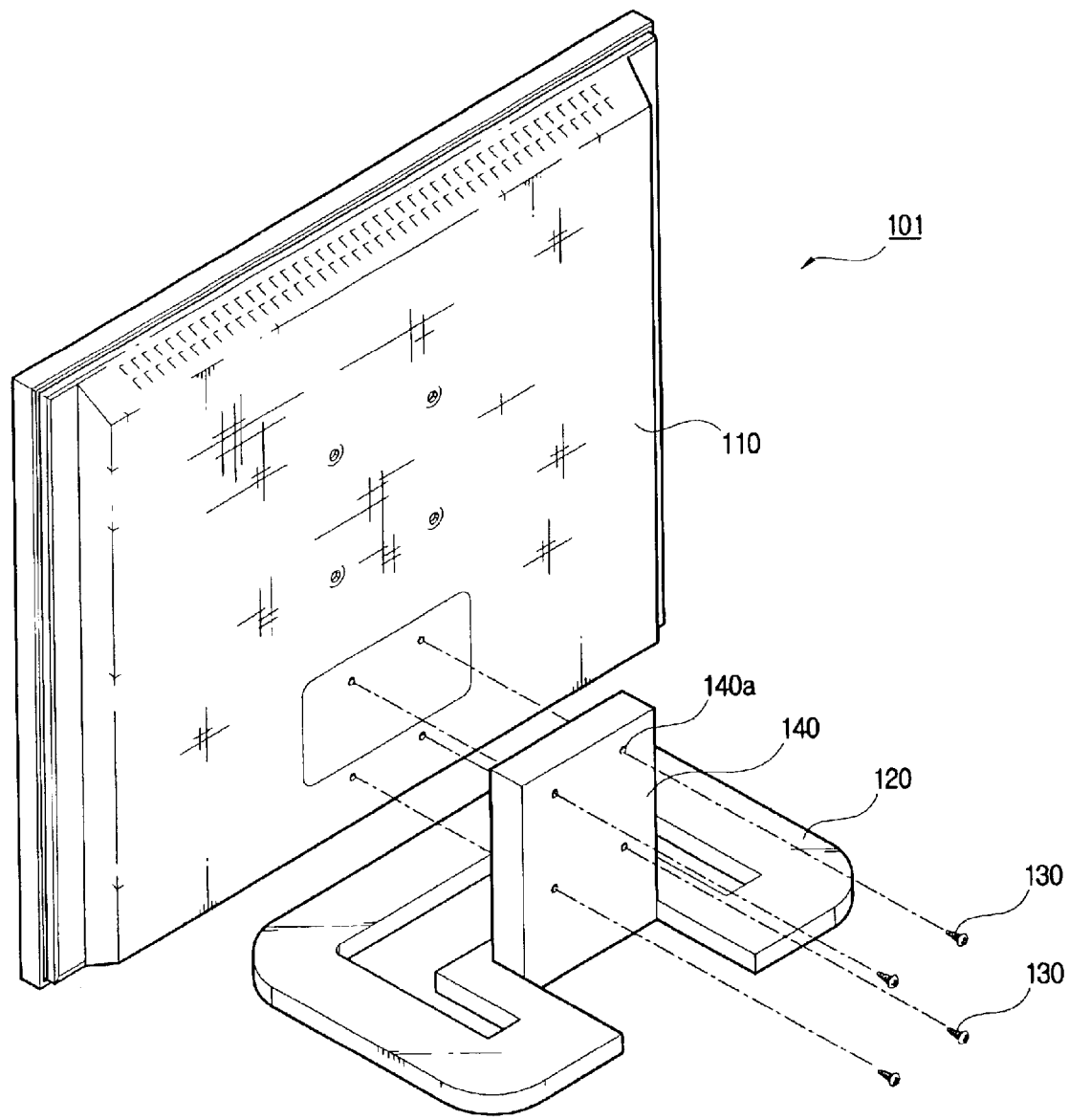
FIG. 1 is a rear perspective view of a conventional displaying apparatus.
Figure 2:
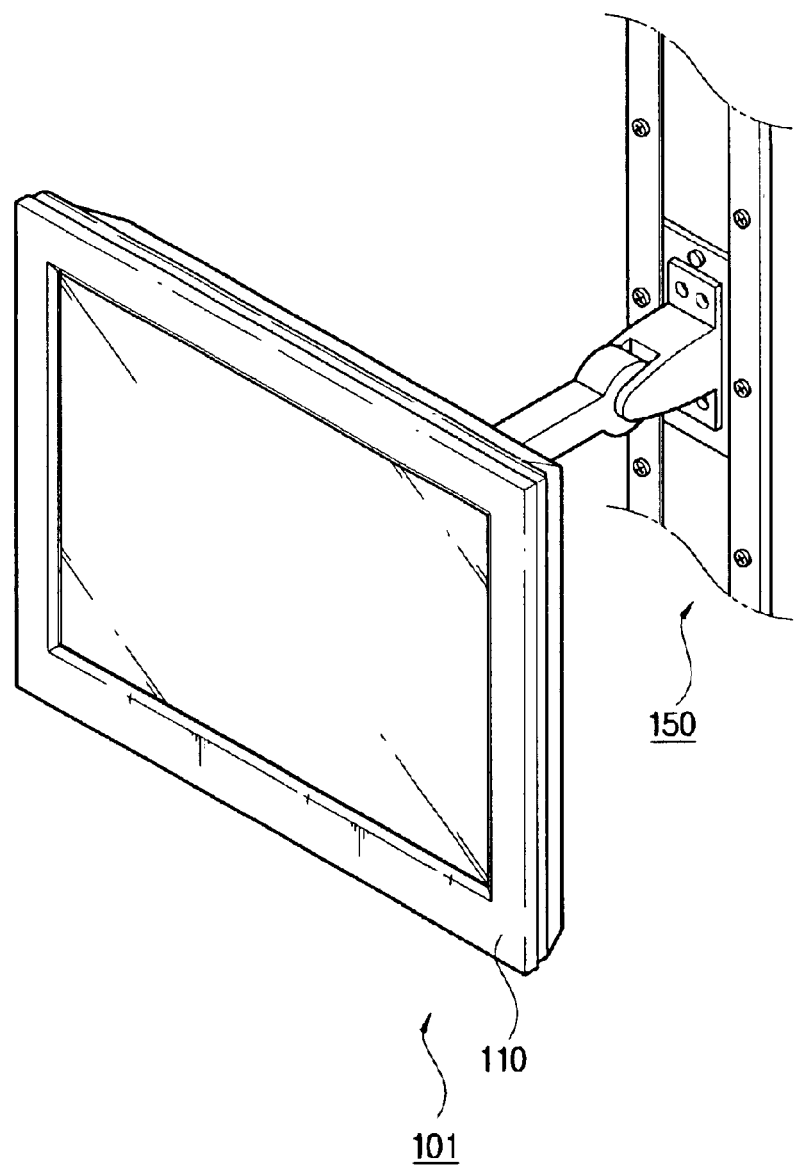
FIG. 2 is a perspective view demonstrating a conventional displaying apparatus which is installed as a wall-mounted type displaying apparatus.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
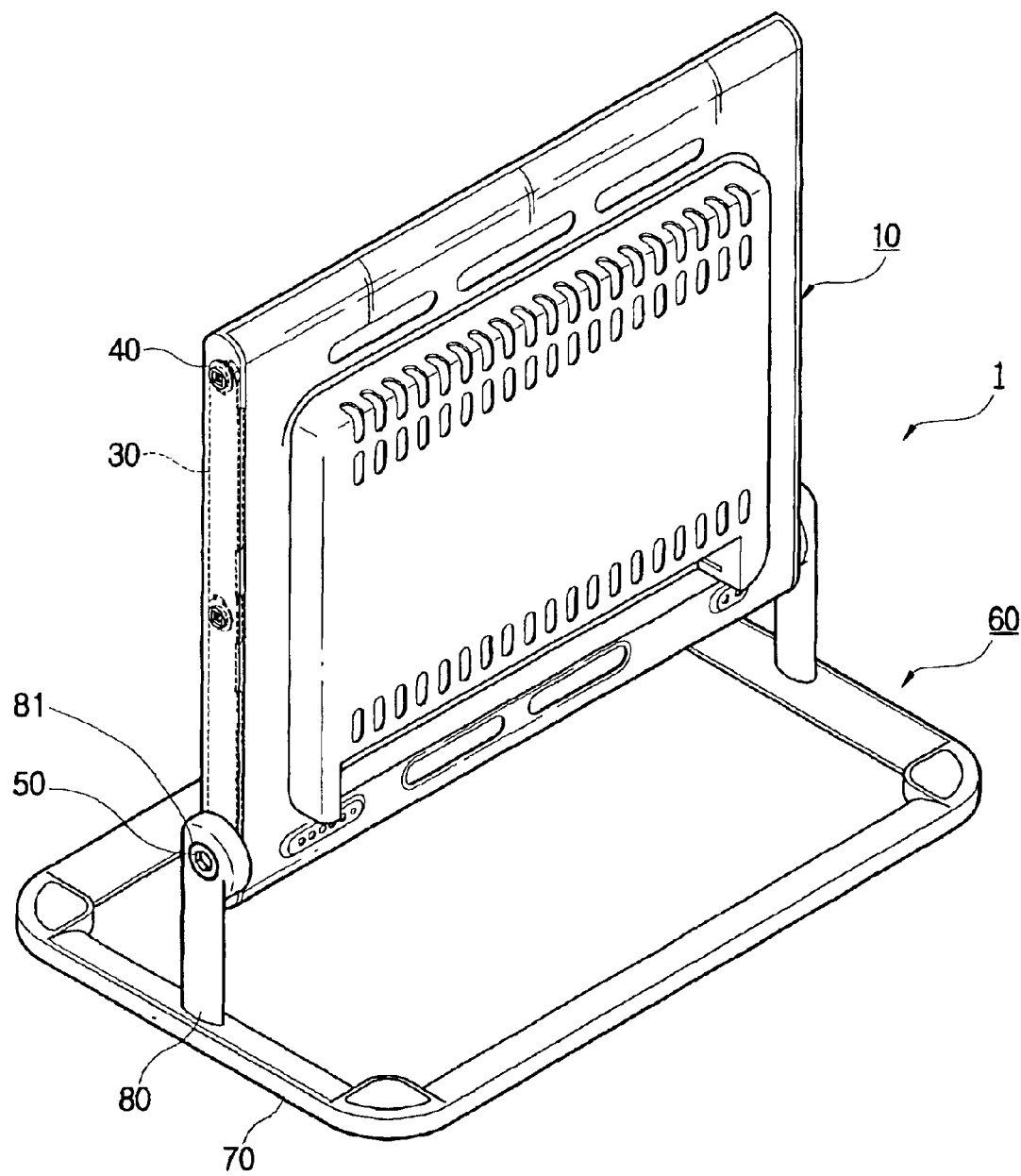
FIG. 3 is a rear perspective view of a displaying apparatus according to a first embodiment of the present invention.
Figure 4:
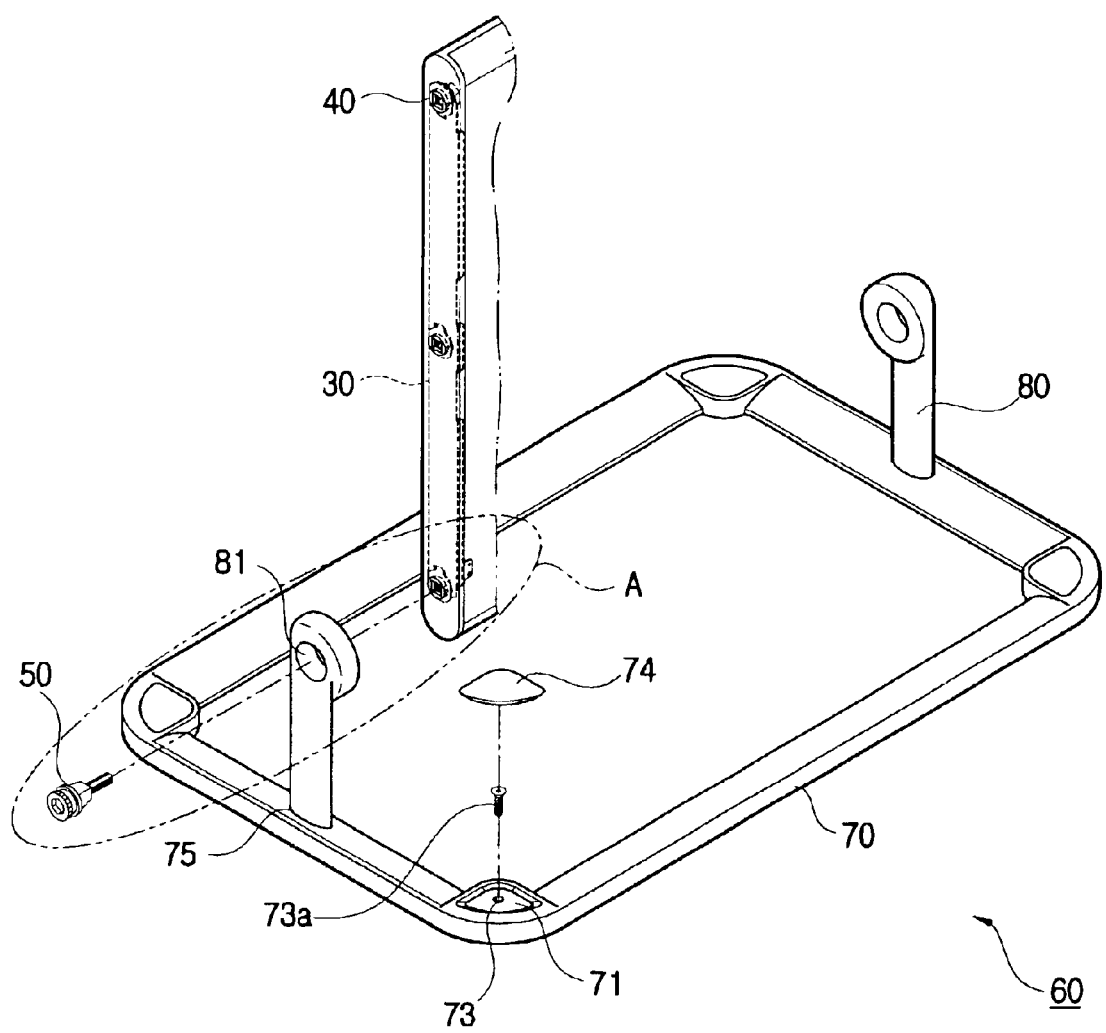
FIG. 4 is a partially enlarged view of a base member of FIG. 3.
Figure 5:
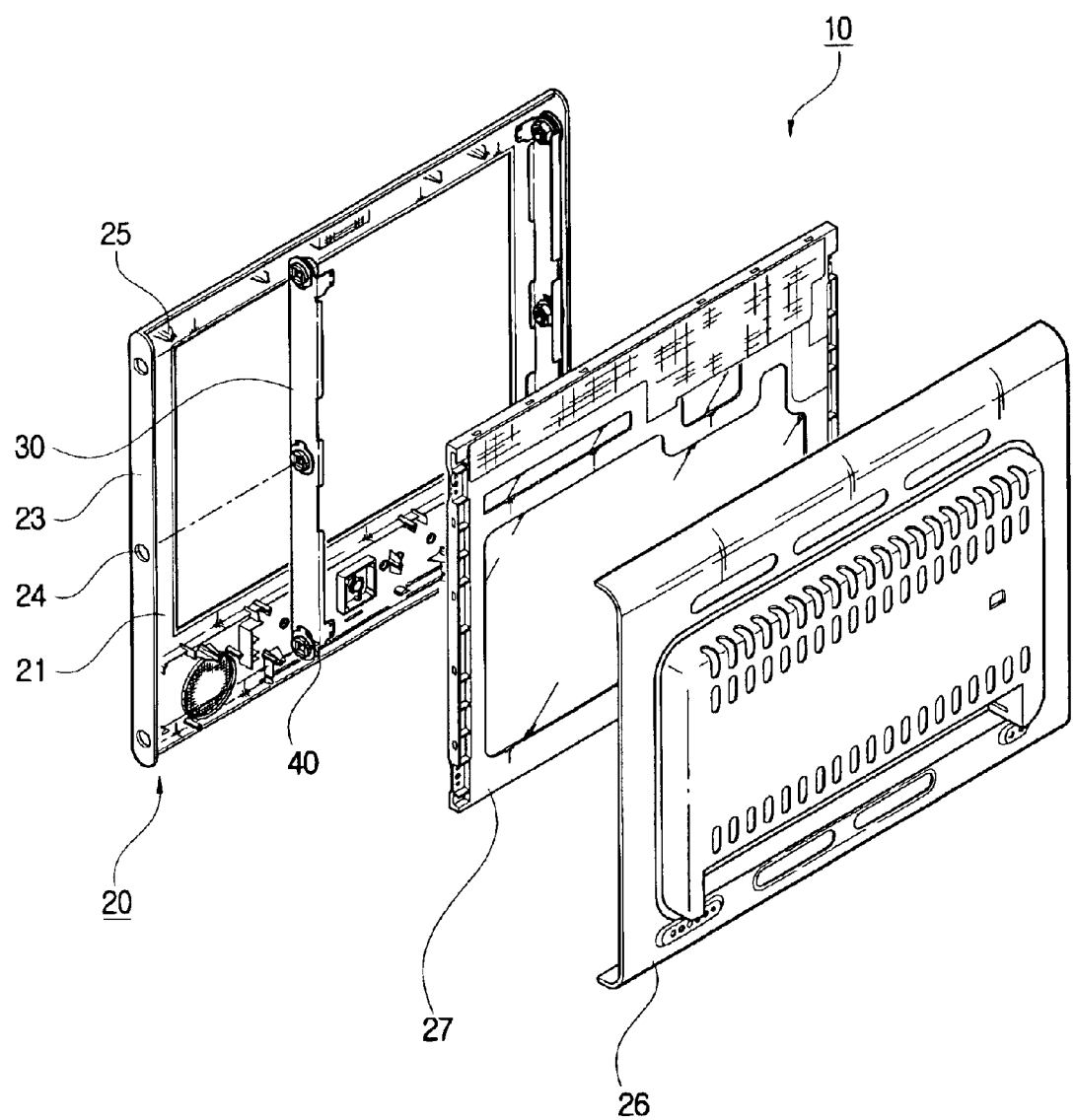
FIG. 5 is an exploded view of a monitor body of FIG. 3.

FIG. 3 is a rear perspective view of a displaying apparatus according to a first embodiment of the present invention, FIG. 4 is a partially enlarged view of a base member of FIG. 3, and FIG. 5 is an exploded view of a monitor body of FIG. 3. As depicted in these figures, a displaying apparatus 1 used with a computer or a TV etc., comprises a monitor body 10 displaying pictures (images) thereon and a base member 60 supporting the monitor body 10.

The base member 60, as illustrated in FIG. 4, is formed with a base part 70 and a plurality of stand parts 80 each formed with a first pass hole 81 on an end thereof, standing at opposite sides of the base part 70.

The base part 70 is made of stainless steel, and corners thereof are rounded. The base part 70 is shaped into a hollow rectangular loop. On each corner of the base part 70 is provided a depressed part 71 which is depressed to a predetermined depth from a planar surface of the base part 70 and a cover member 74 made of rubber, which is detachably engaged into the depressed part 71.

In a center of the depressed part 71 is formed a bolt-inserting hole 73 through which a bolt 73a is inserted so as to allow the displaying apparatus 1 to be installed on a wall or a ceiling as the wall-mounted type displaying apparatus.

The stand part 80 is formed of a stainless steel like the material of the base part 70, defined as being bar-shaped. A bottom of the stand part 80 is fixed to a receiving part 75 formed in the base part 70 by a bolt (not shown) and a top thereof is bent toward the monitor body 10. On the bent portion is provided the first pass hole 81 allowing a coupling member 50 (to be described later) to be inserted thereinto.

When a user requires installation of the displaying apparatus 1 as the wall-mounted type displaying apparatus, the user first removes the cover member 74 detachably inserted into the depressed part 71, inserts the bolt 73a into the bolt-inserting hole 73 and screw-couples the bolt 73a to a surface for installation on the wall or the ceiling, thereby allowing the base member 60 to be fixed to the wall or the ceiling.

As illustrated in FIG. 5, the monitor body 10 includes a front cover 20, a rear cover 26 and an LCD panel 27. The front cover 20 and the rear cover 26 are combined with each other, forming a space receiving some elements inside thereof, and the LCD panel is positioned within the receiving space, having an effective face on which pictures are displayed.

The front cover 20 comprises a front face part 21 formed with a window on a planar surface thereof, allowing the effective face of the LCD panel 27 to be exposed to the outside through the window of the front cover 20, and skirt parts 23 bent toward the rear cover 26 from opposite sides of the front face part 21. On an inner wall side of each skirt part 23 are formed exposed holes 24, allowing a rotating member 40 of each bracket member 30 to be inserted and exposed to the outside. A plurality of coupling parts 25 is provided on a rear face of the front face part 21 to fix each of the bracket members 30 to each of the skirt parts 23, respectively.

Figure 6:
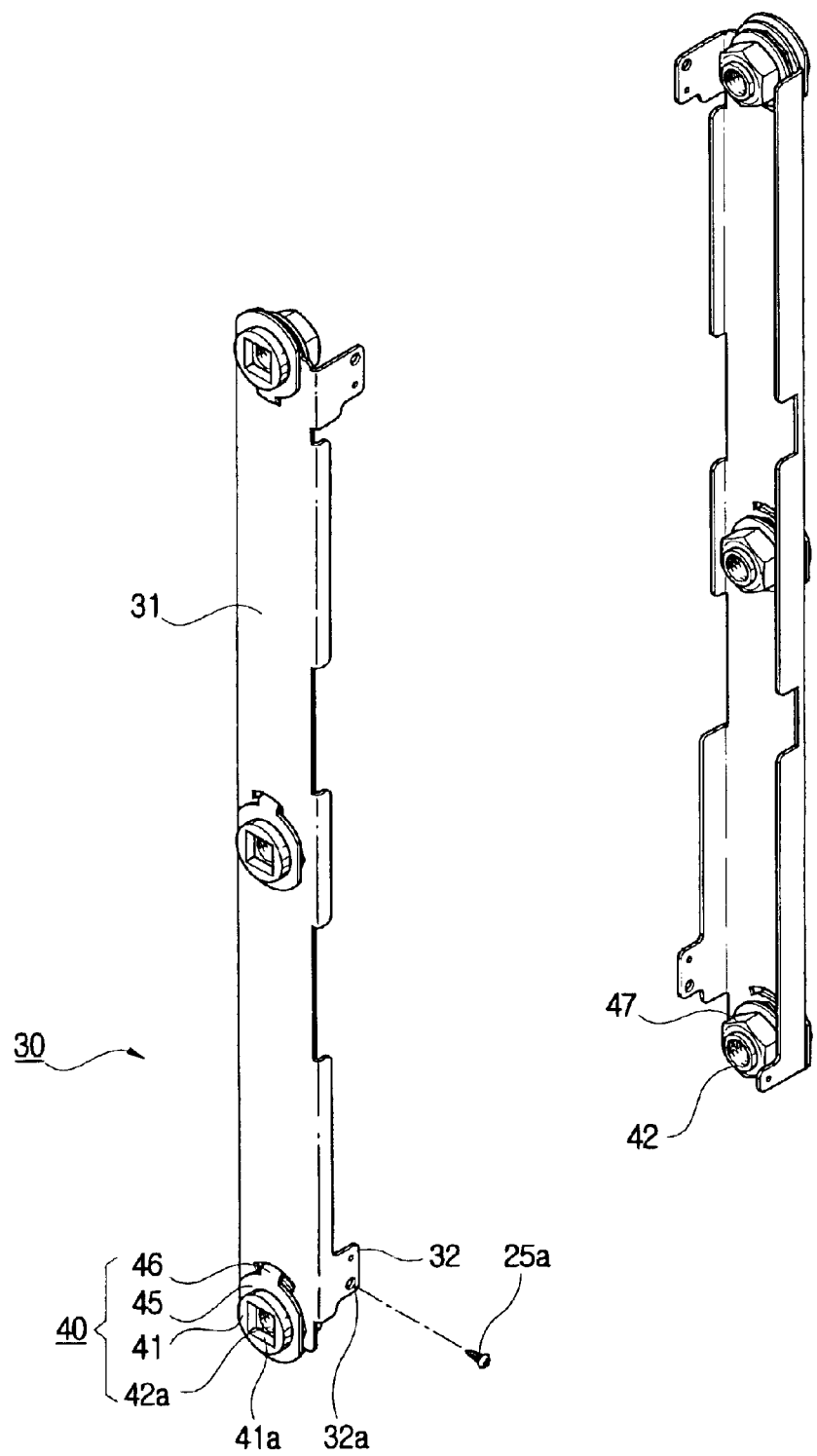
FIG. 6 is a perspective view showing a front and a rear of a bracket member of FIG. 5.
Figure 7:
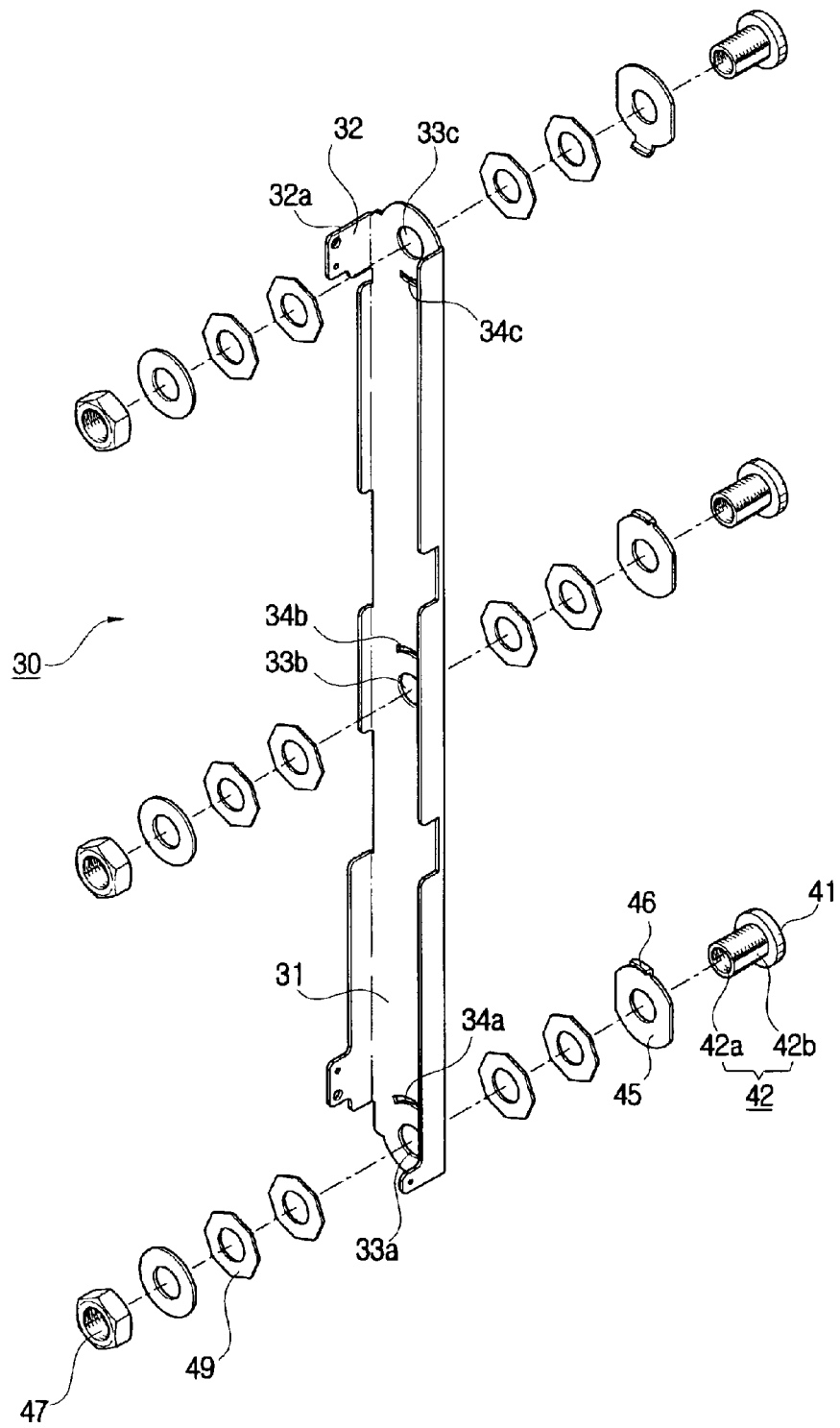
FIG. 7 is an exploded perspective view of the bracket member of FIG. 3.

Each of the bracket members 30 has a long bar shape, being detachably combined to an inner wall side of each skirt part 23, respectively. As depicted in FIGS. 6 and 7, each of the bracket members 30 includes a bracket part 31 forming a main body thereof, second pass holes 33a, 33b, 33c formed on a planar surface of the bracket part 31, elongated holes 34a, 34b, 34c of a partial arc-shape formed through a planar surface of the bracket part 31 adjacent to the second pass holes 33a, 33b, 33c, respectively, and the rotating member 40 combined with the second pass holes 33a, 33b, 33c.

The bracket part 31 is formed of stainless steel, having an approximate "U" shape in section, comprising a plurality of flange parts 32 combining the bracket member 30 with the front cover 20, and the plurality of the second pass holes 33a, 33b, 33c formed lengthwise on the planar surface meeting the inner sides of each of the skirt parts 23, respectively, at predetermined intervals.

Each of the flange parts 32 is bent from the planar surface on which the second pass holes 33a, 33b, 33c are formed, so as to allow each of the flange parts 32 to be combined with respective coupling parts 25 of the front cover 20. On the planar surface of each of the flange parts 32 is provided a coupling hole 32a corresponding to the coupling part 25 of the front cover 20, being engaged with a bolt 25a, thereby fixing the bracket member 30 to the front cover 20.

The second pass holes 33a, 33b, 33c comprise the second pass hole 33a for the table-mounted type displaying apparatus, and the second pass holes 33b, 33c for the wall-mounted displaying apparatus and the ceiling-mounted types displaying apparatus. To each of the second pass holes 33a, 33b, 33c is coupled a rotating member 40 (to be described below) which is coupled with the first pass hole 81 of the base member 60. Adjacent to each of the second pass holes 33a, 33b, 33c are provided the elongated holes 34a, 34b, 34c in an arc shape, guiding forward or backward rotations of the monitor body 10.

The rotating member 40 comprises a first boss 41, a main body 42 having a female screw 42a formed coaxially with the first boss 41, an extension rib 45 connected to the main body 42, the extension rib having one end movably positioned within the elongated holes 34a, 34b, 34c, a disengagement-preventing nut 47 combined with a male screw 42b of the main body 42, and a plurality of washers 49 provided between the disengagement-preventing nut 47 and the main body 42.

The first boss 41 is formed of stainless steel, being inserted into the exposed holes 24 formed on the skirt part 23, thereby being exposed to the outside. Further, the first boss 41 has a rectangular depressed part 41a depressed to a predetermined depth from the planar surface thereof, being fitted with a second boss 55 of a coupling member 50, to be described later (see FIG. 8), thereby rotatably moving the monitor body 10 against the base member 60.

The main body 42 is integrally extended from the first boss 41, being inserted into the second pass holes 33a, 33b, and 33c. The female screw 42a provided coaxially with the first boss 41 is formed in the main body 42, and the male screw 42b is formed on an outer circumference of the main body 42. The male screw 42b couples the rotating member 40 to the bracket member 30, by which the disengagement-preventing nut 47 preventing the rotating member 40 from being disengaged from the bracket member 40 can be engaged. Accordingly, the female screw 42a of the main body 42 is engaged with a male screw part 53a formed on a shaft part 53 of a coupling member 50, to be described later, thereby interconnecting the base member 60 and the monitor body 10. The male screw 42b of the main body 42 is engaged with the disengagement-preventing nut 47, thereby fixedly positioning the rotating member 40 to the bracket member 30.

The extension rib 45 is positioned between the first boss 41 and the main body 42. The extension rib 45 is formed of stainless steel as in the first boss 41 and the main body 42. As shown in FIG. 7, the extension rib 45 includes a guide part 46 bent from the planar surface on one side thereof which allows the extension rib 45 to move while being inserted into the elongated holes 34a, 34b, 34c of the bracket part 31. The extension rib 45 is forcibly engaged into the first boss 41 and rotates together with the first boss 41. Therefore, since a position of the first boss 41 is fixed by the second boss 55, a rotation angle of the monitor body 10 forward and backward is limited to a rotation range of the guide part 46 of the extension rib 45 inserted within the elongated holes 34a, 34b, 34c, if the monitor body 10 rotates forward or backward relative to the base member 60.

The plurality of washers 49 is positioned between the extension rib 45 and the bracket part 31, and the bracket part 31 and the disengagement-preventing nut 47. The washers 49 generate frictional forces by which the bracket member 30 can be rotated relative to the rotation member 40.

Figure 8:
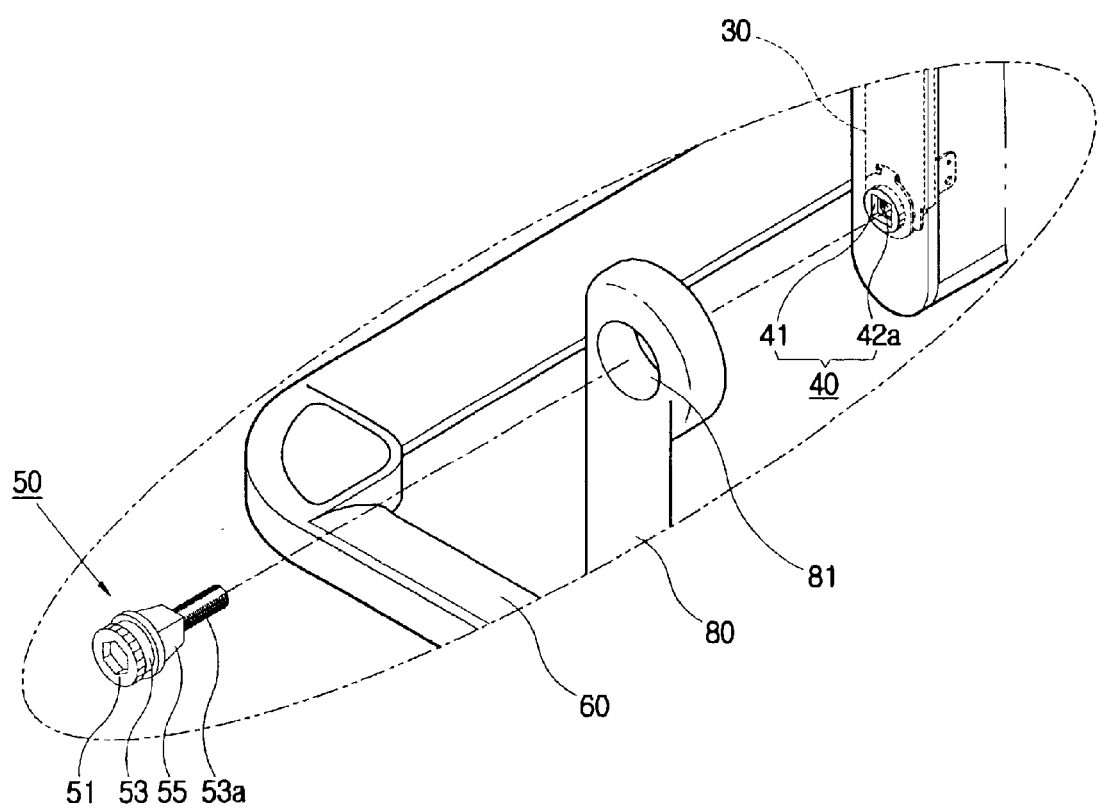
FIG. 8 is a partially enlarged view of FIG. 4 showing "A" of FIG. 4.

The coupling member 50 coupled with the rotation member 40, thereby coupling the monitor body 10 and the base member 60 and allowing the monitor body 10 to be rotated to a predetermined degree relative to the base member 60, comprises a head part 51, the shaft part 53 extended from the head part 51 and formed with the male screw part 53a with which the female screw 42a of the rotation member 40 is engaged, a second boss 55 provided so as to move lengthwise to the shaft part 53, being fitted into the first boss 41, as shown in FIG. 8.

The head part 51 has a cylindrical shape, and is formed of stainless steel. On the top of the head part 51 is formed a depressed part in hexagonal shape, into which a wrench member (not shown) can be inserted. The depressed part is exposed outside when the base member 50 and the monitor body 10 are engaged.

The shaft part 53 is extended integrally from the head part 51. On the end of the shaft part 53 is formed the male screw part 53a engaged with the female screw 42a of the rotating member 40. The shaft part 53 of the coupling member 50 is inserted within the first pass hole 81, and then engaged with the female screw 42a of the rotating member 40, thereby coupling the monitor body 10 and the base member 60.

The second boss 55 is provided to move axially to the shaft part 53 adjacent to the head part 51 and is fitted into the first boss 41 of the rotating member 40. The second boss 55 has a rectangular sectional shape and is engaged with the first boss 41, as shown in FIG. 8. Accordingly, when the coupling member 50 is inserted into the first pass hole 81 and the female screw 42a of the rotating member 40 and the male screw part 53a of the coupling member 50 are engaged, the second boss 55 is fitted into the first boss 41. Thus, if the monitor body 10 is rotated forward or backward, the degree of rotation (angle of rotation) of the monitor body 10 is limited to correspond with the rotation range of the guide part 46 inserted within the elongated hole 33, thereby controlling a visual angle of the displaying apparatus with respect to a viewer.

Figure 9:
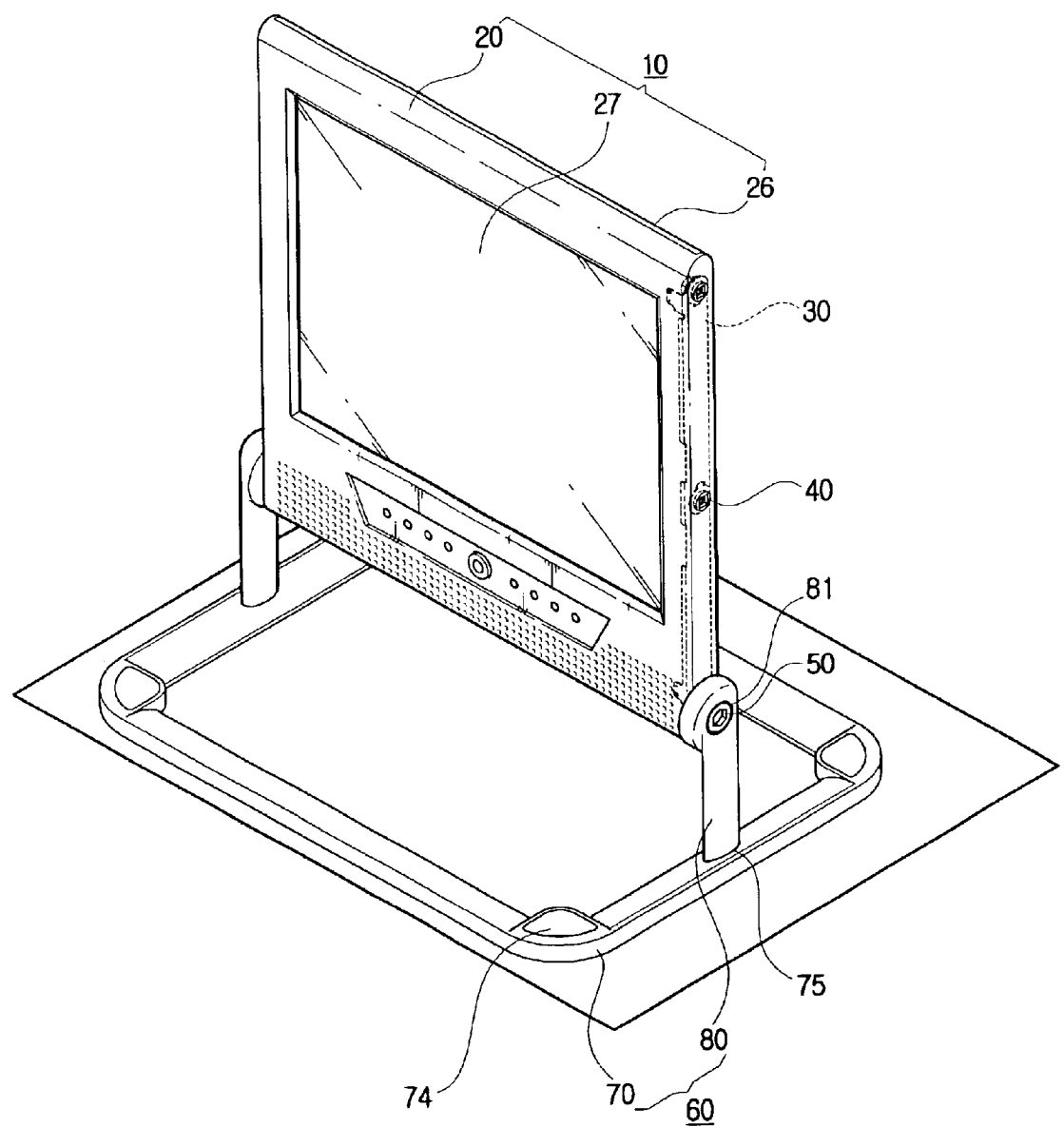
FIG. 9 is a perspective view showing a displaying apparatus according to the first embodiment of the present invention which is installed as a table-mounted type.

With this configuration, the displaying apparatus 1 can be installed through the following processes.

Where the displaying apparatus 1 is installed as a table-mounted type displaying apparatus, the base part 70 of the base member 60 is first placed on an installation surface of any table, etc. The second pass hole 33a of the bracket member 30 for table mounting, which is coupled to both side walls of the monitor body 10, is placed so as to mutually communicate with the first pass hole 81 formed in the stand part 80. The coupling member 50 is inserted within the first pass hole 81 so as to engage the female screw 42a of the rotating member 40 coupled with the second pass hole 33a with the male screw part 53a of the coupling member 50, thereby enabling the displaying apparatus 1 to be easily installed as a table-mounted type displaying apparatus (see FIG. 9).

Figure 10:
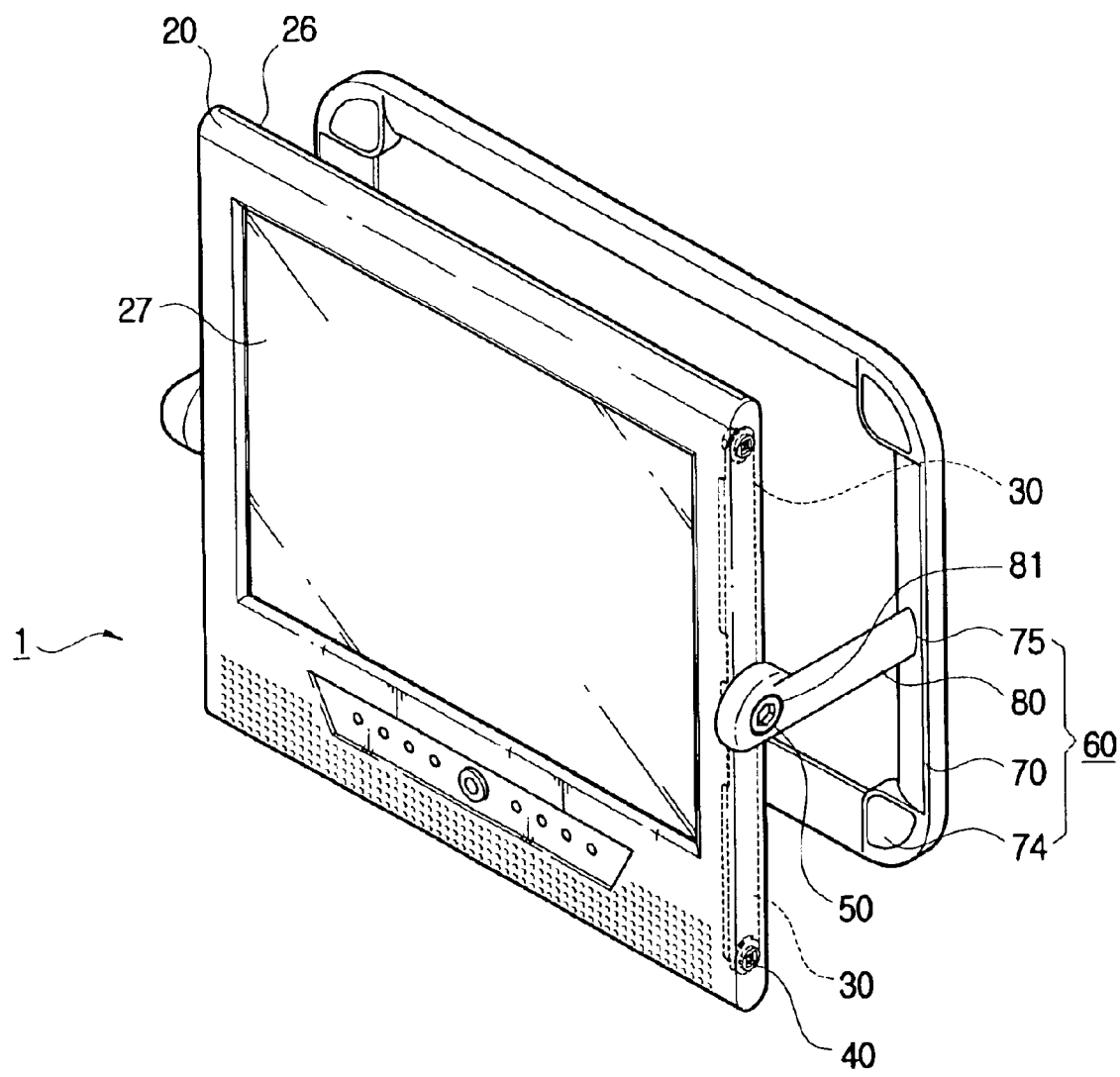
FIGS. 10 and 11 are perspective views showing a displaying apparatus according to the first embodiment of the present invention which is installed as the wall-mounted type displaying apparatus.

When the monitor body 10 is rotated forward or backward about the rotational axis centered around the coupling member 50, while the coupling member 50 is being coupled to the rotating member 40 to control the visual angle of the monitor body 10 in the displaying apparatus 1 installed as the table-mounted type displaying apparatus, the monitor body 10 is limited in the degree of rotation to correspond with the rotation range of the guide part 46 inserted within the elongated hole 33a, thereby controlling the visual angle of the displaying apparatus.

Where the displaying apparatus 1 is installed on a wall as shown in FIG. 10, the base part 70 of the base member 60 is first positioned on an installation surface and the cover member 74, which covers the depressed part 71 formed on each corner of the base part 70, is removed. Then, the bolt 73a is inserted within the bolt-inserting hole 73 formed on the depressed part 71 and screw-coupled to the installation surface, thereby fixedly positioning the base member 60.

The second pass hole 33b of the bracket member 30 for wall mounting, which is coupled to both side walls of the monitor body 10, is placed so as to mutually communicate with the first pass hole 81, which is formed in the stand part 80. The coupling member 50 is then inserted within the first pass hole 81 so as to engage the female screw 42a of the rotating member 40 coupled with the second pass hole 33b with the male screw part 53a of the coupling member 50. Since the monitor body 10 is supported by the base member 60 fixed on a wall side, as shown in FIG. 10, the displaying apparatus 1 can easily be installed as a wall-mounted type displaying apparatus. The method of controlling the visual angle of the monitor body 10 is the same as described above in the table-mounted type displaying apparatus.

Figure 11:
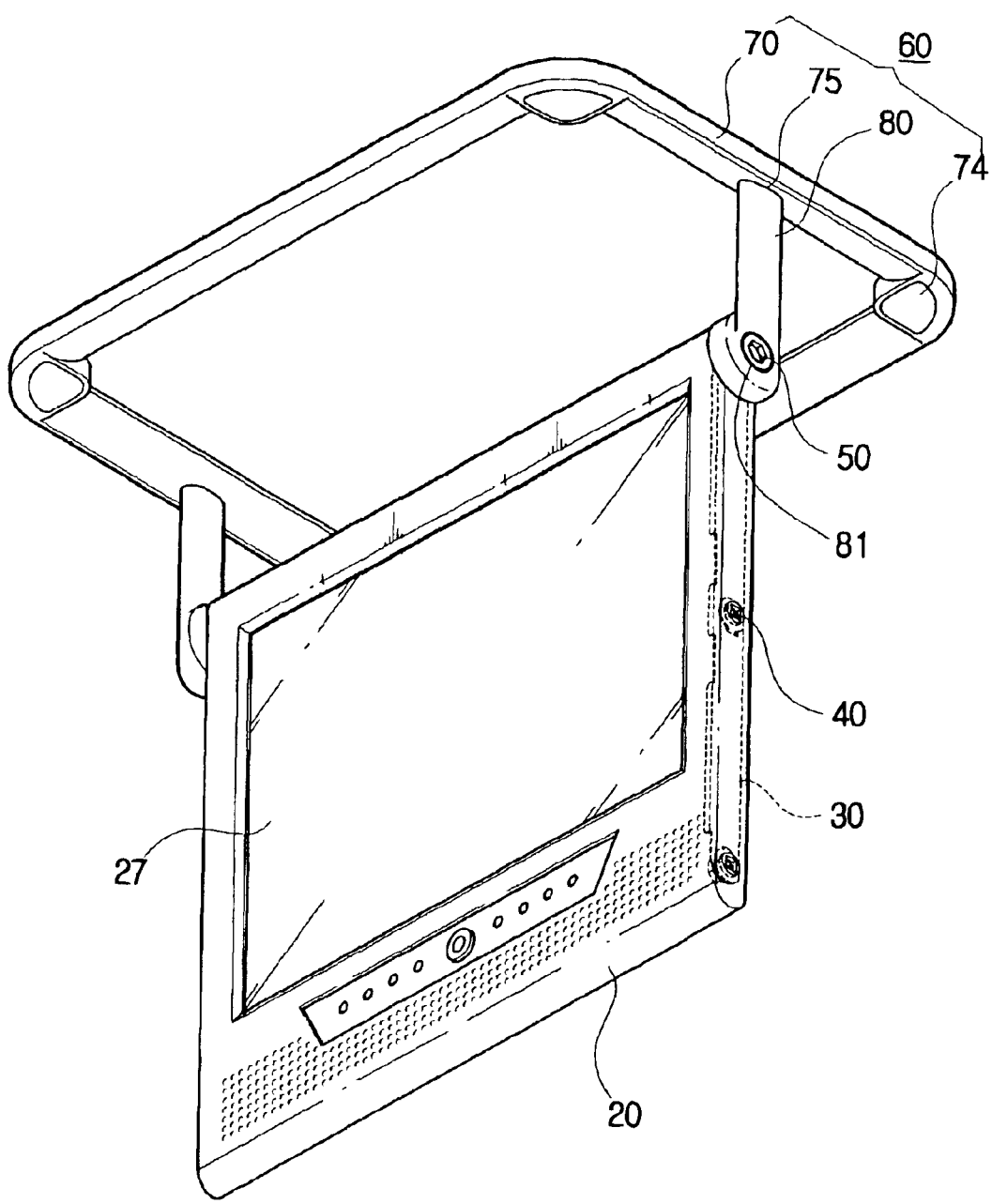

The processes of installing the displaying apparatus 1 on the ceiling, as shown in FIG. 11, are generally the same as those of installing the displaying apparatus 1 on the wall described above, except for the installation surface which is the ceiling rather than the wall, and the second pass hole being second pass hole 33c for the ceiling mount rather than being 33b for the wall mount.

Figure 12:
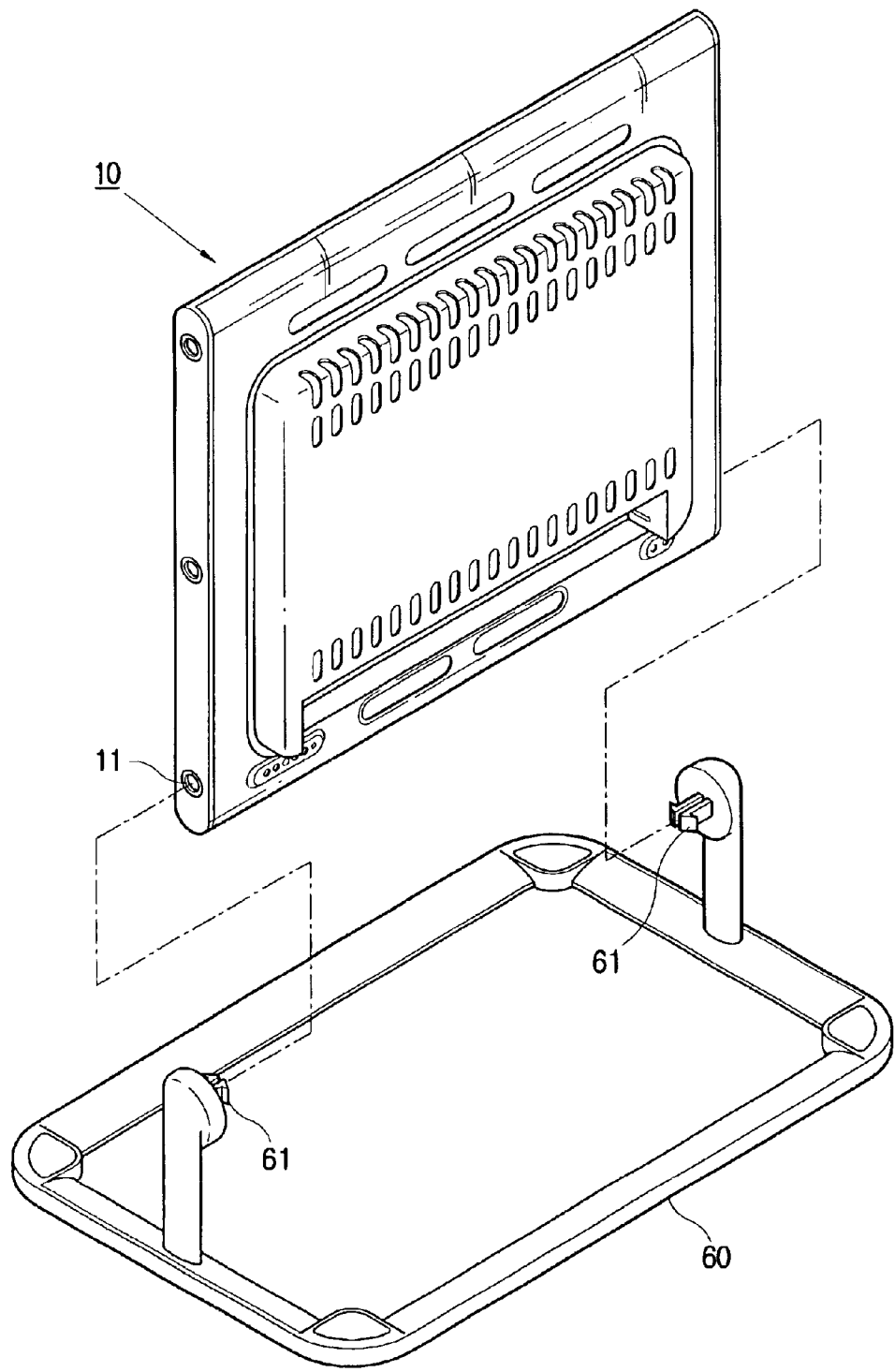
FIG. 12 is an exploded view of a displaying apparatus according to a second embodiment of the present invention.

In the above-described embodiments of the present invention, installation places of the displaying apparatus 1 can be easily changed by providing the second pass holes 33a, 33b, 33c and the rotating member 40 on the bracket member 30 and providing the first pass hole 81 on the stand part 80, the stand part being selectively coupled to one of the plurality of second pass holes 33a, 33b, 33c by the coupling member 50. However, as illustrated in FIG. 12, a plurality of hooking parts 61 is fixedly provided in the base member 60 and a plurality of hook-receiving parts 11, which is detachably engaged with the plurality of hooking parts 61 of the base member 60, respectively, are provided on opposite side walls of the monitor body 10, thereby coupling the base member 60 and the monitor body 10 by a hook structure.

Figure 13:
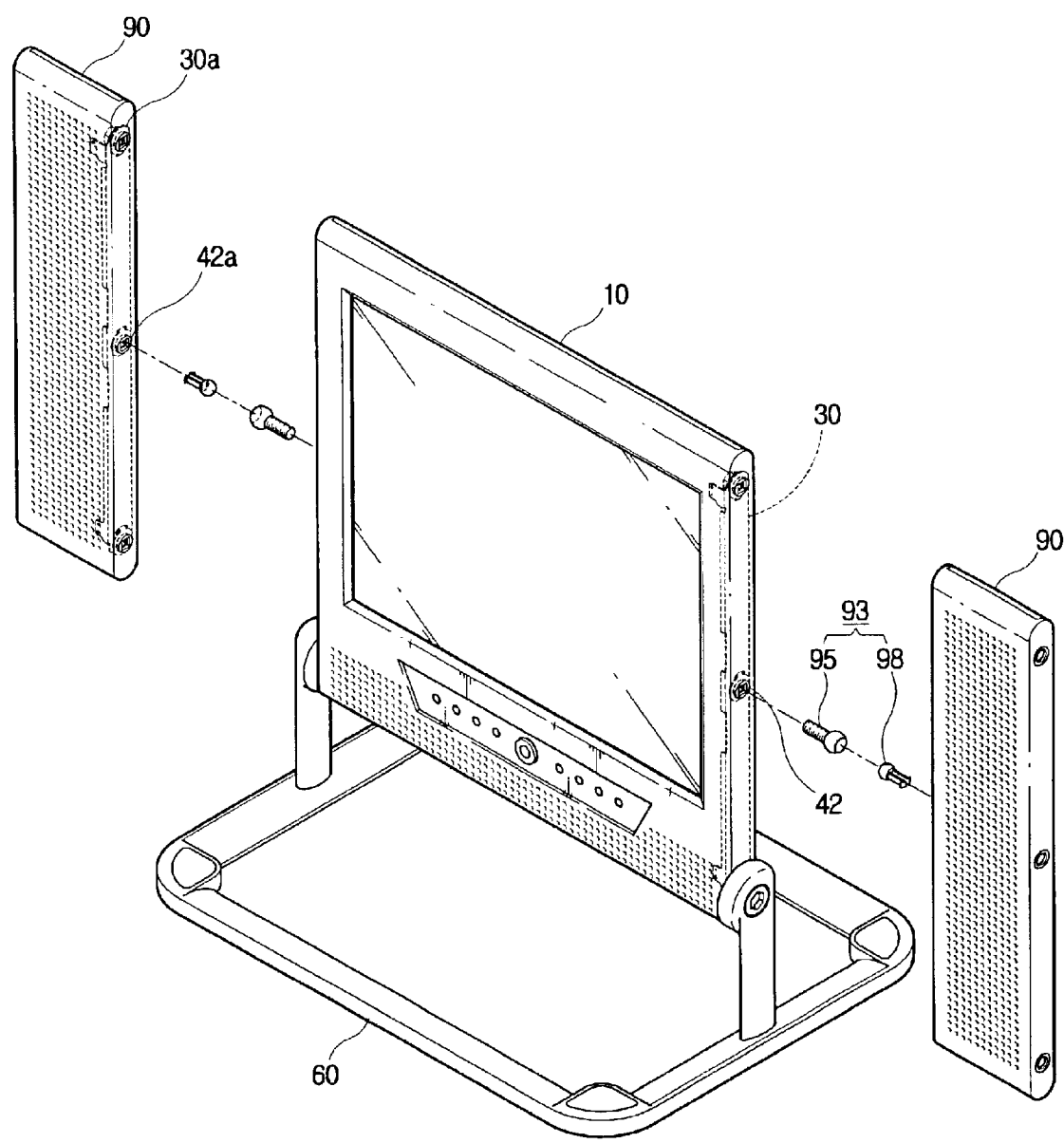
FIG. 13 is an exploded view of a displaying apparatus according to a third embodiment of the present invention.

In the displaying apparatus 1 according to the present invention, auxiliary devices 90 such as loudspeakers or LCD panels also can be installed on the monitor body 10 (see FIG. 13).

The auxiliary devices 90 are mounted to the bracket member 30 described above. The auxiliary devices 90 are fixedly positioned on the monitor body 10 by a connection supporting member 93 supportedly interconnecting the bracket member 30 and the auxiliary devices 90. Hereinbelow, an embodiment of the present invention will be described with, for example, a loudspeaker as the auxiliary device 90 detachably coupled to the monitor body 10.

A bracket member 30a for the auxiliary device is positioned on a side wall surface of the loudspeaker 90 opposite to an installation surface of the monitor body 10. The bracket member 30a comprises components formed of stainless steel, which is the same as for the bracket member 30 described above.

Figure 14:
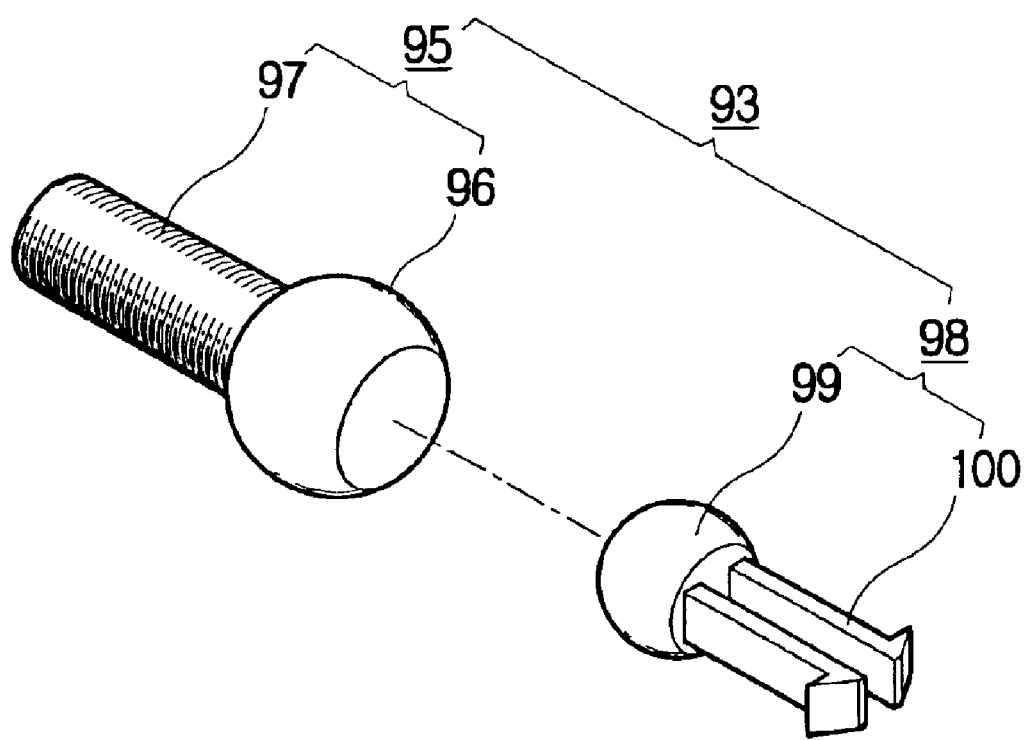
FIG. 14 is a perspective view showing a connection supporting member of FIG. 13.

The connection supporting member 93 comprises a first unit member 95 and a second unit member 98, which are combined with each other by a ball joint, as illustrated in FIG. 14.

On one end of the first unit member 95 is formed a ball housing 96. To the ball housing 96 is provided a male screw 97, which engages with the female screw 42a of one of the bracket members 30 and 30a for the monitor body 10 and the auxiliary device 90.

On one end of the second unit member 98 is formed a ball 99 which is freely and rotatably housed in the ball housing 96 of the first unit member 95. To the ball 99 is provided a hooking part 100, which is hooked into a main body 42 of the other of the bracket members 30 and 30a for the monitor body 10 and the auxiliary device 90.

With this configuration, the auxiliary device 90 can be engaged into and disengaged from the displaying apparatus 1 through the following processes.

Figure 15:
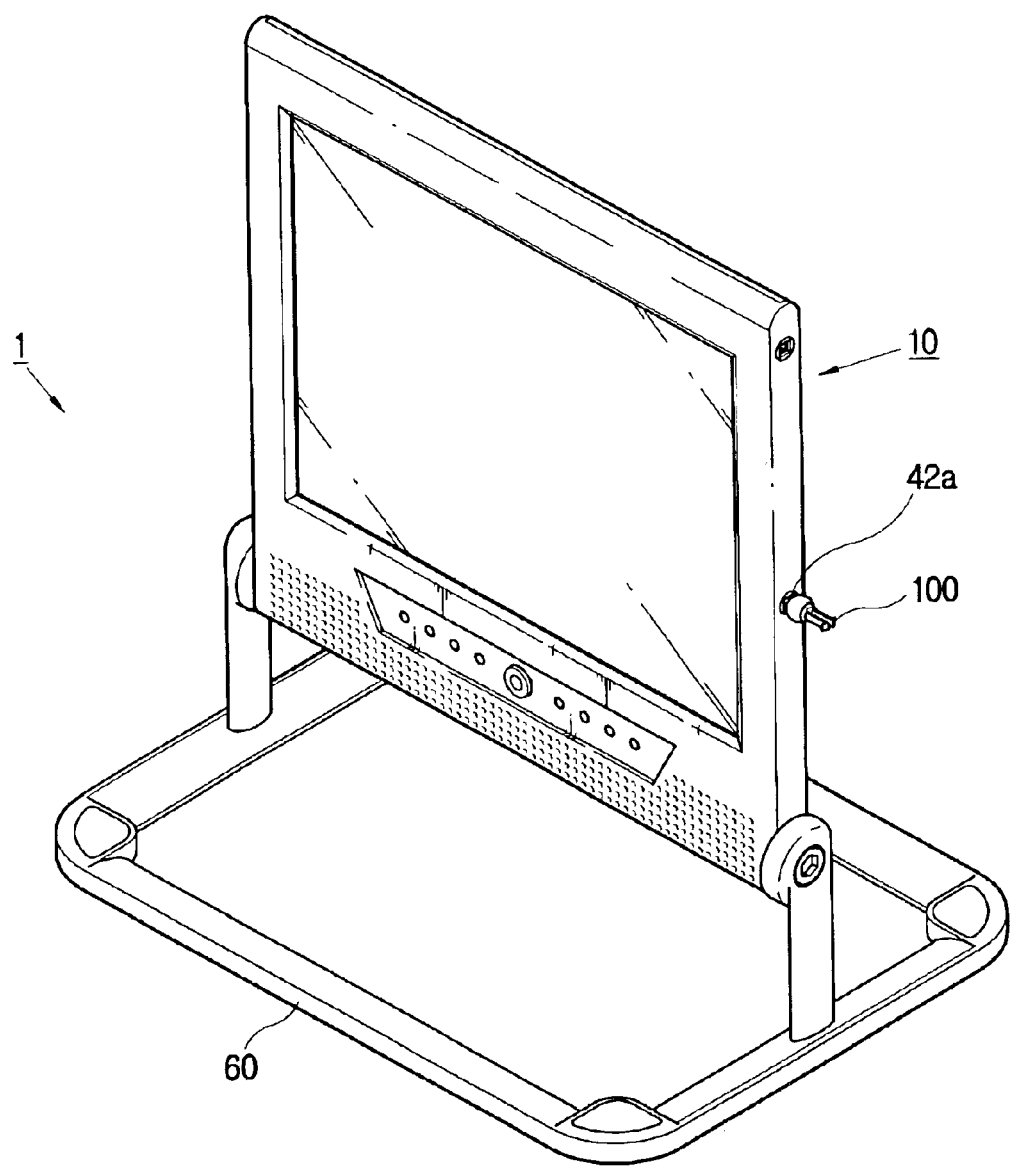
FIGS. 15 through 17 are views depicting processes of installing the displaying apparatus according to the third embodiment of the present invention.
Figure 16:
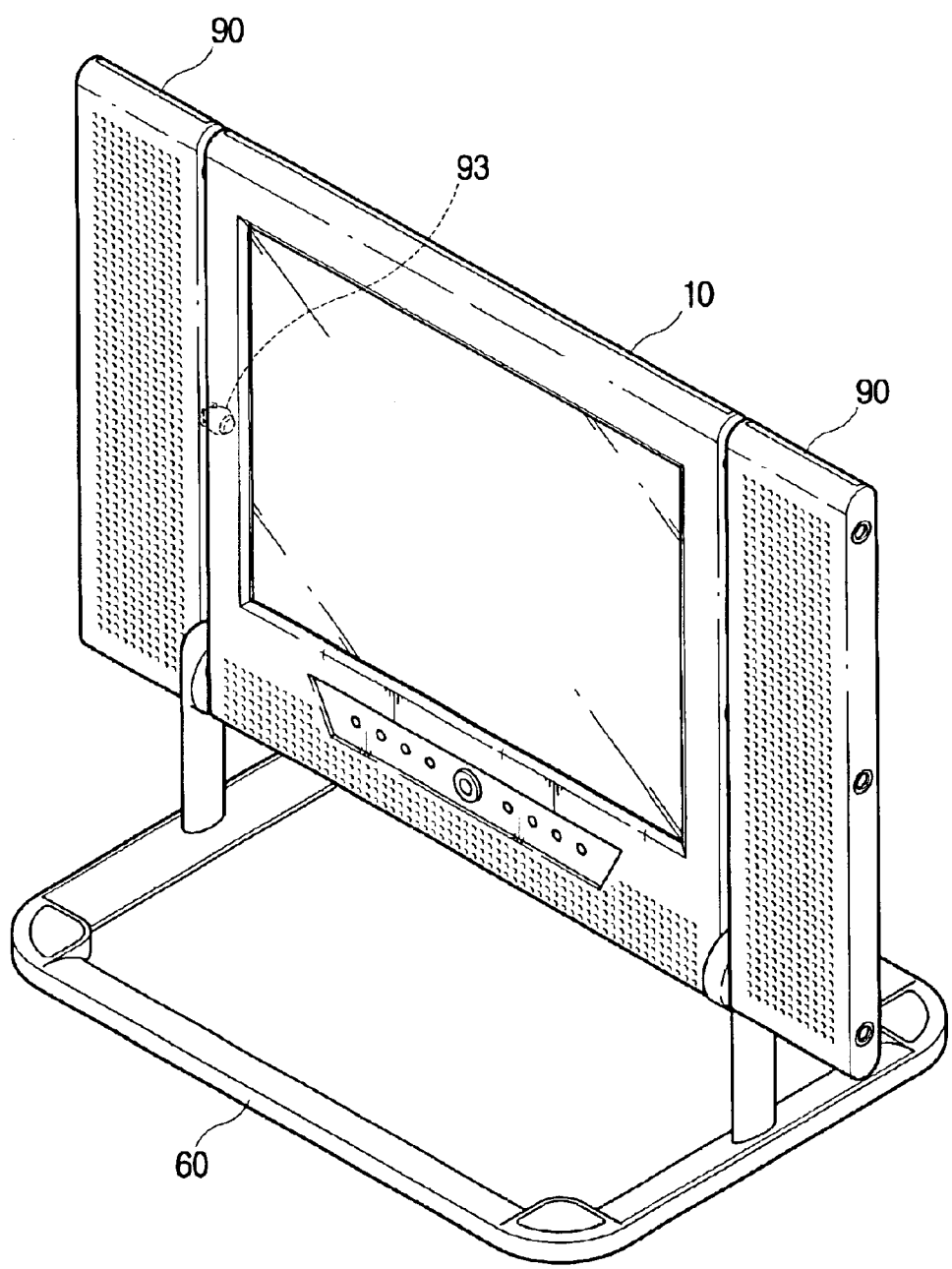
Figure 17:
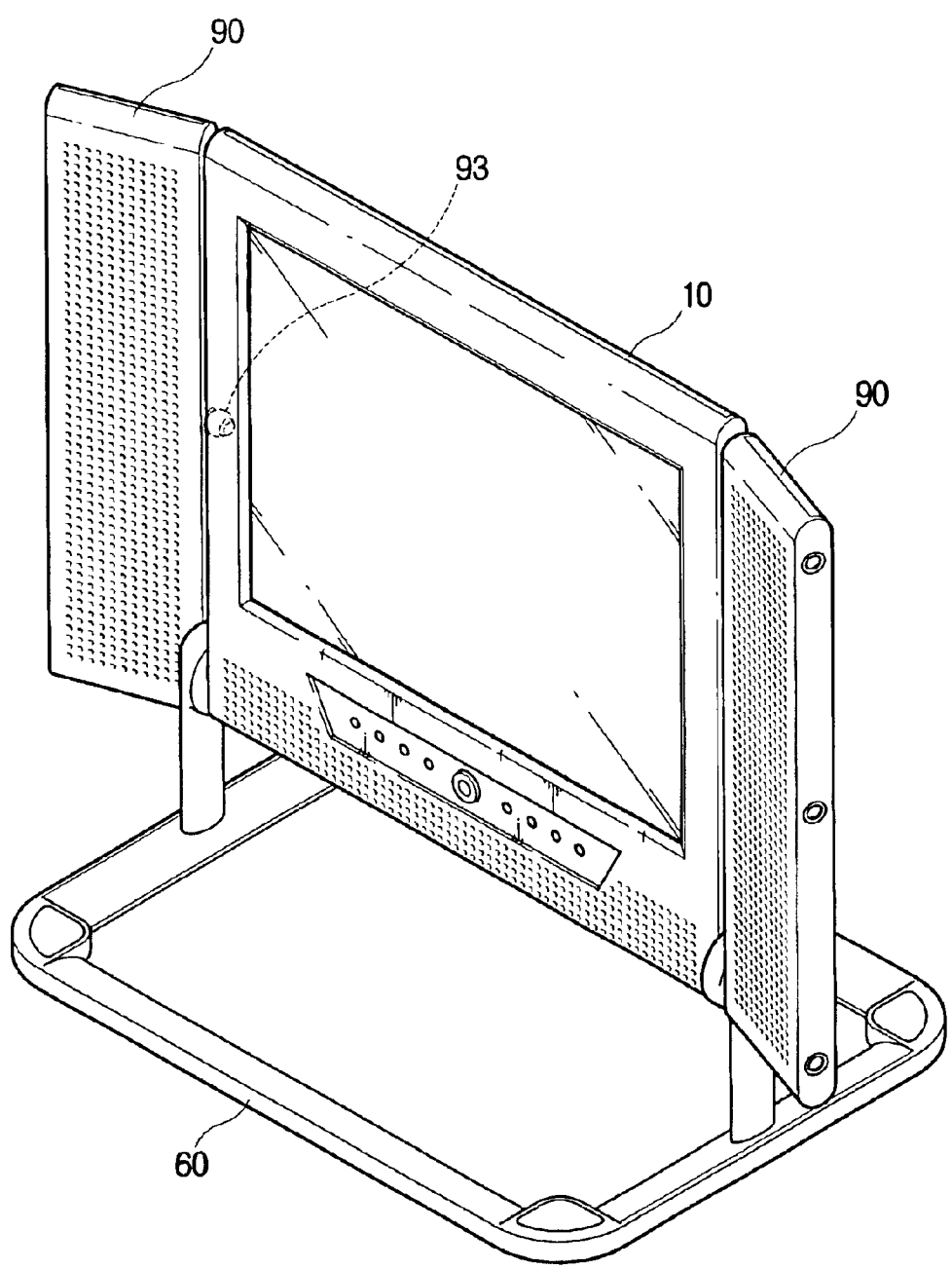

The male screw 97 of the first unit member 95 is engaged with the female screw 42a of the bracket member 30 positioned on the installation surface of the monitor body 10 on which a user desires to install the auxiliary device 90 (see FIG. 15). Thus, when one end of the unit member 94 is fixed to the monitor body 10, the second unit member 98 provided with the hooking part 100 is exposed to the side wall of the monitor body 10. Then, the user connects the hooking part 100 exposed to the side wall of the monitor body 10 with the main body 42 of the bracket member 30a for the auxiliary device, thereby with ease detachably coupling the auxiliary device 90 to the monitor body 10 (see FIG. 16). Thus, the installation angle of the auxiliary device 90 is easily controlled by the connection supporting member 93 of the ball joint as shown in FIG. 17.

In the displaying apparatus 1, disengagement of the auxiliary device 90 from the monitor body 10 can be performed in a reverse process to that which is described above.

In the above-described embodiment, the first and second unit members 95, 97 of the connection supporting member 93 interconnected by a ball joint structure are provided and the auxiliary device 90 is rotatably provided relative to the monitor body 10. However, in the case that no control is needed over the angle of the auxiliary device 90 positioned relative to the monitor body 10, a variety of connection supporting members can be provided. For example, the connection supporting member may have a male screw formed on one end thereof and a hooking part formed on the other end thereof.

In the above-described embodiment, the auxiliary devices 90 are displaced on both sides of the monitor body 10. However, the auxiliary devices 90 can be positioned on the top or on the bottom of the monitor body 10. In such a case, the bracket member 30 provided in the monitor body 10 is also positioned on the top or on the bottom of the monitor body 10 so as to allow the auxiliary device 90 to be coupled to the top or bottom of the monitor body 10.

In the above-described embodiment, a pair of auxiliary devices is only installed to the monitor body 10. However, one or more other auxiliary devices can also be connected to the auxiliary device 90. For example, multi-screens can be formed by connecting one or more LCD panel s to an LCD panel provided as the auxiliary device 90. Even in such a case, each of the one or more other auxiliary devices and the auxiliary device 90 are interconnected by the bracket member 30a for the auxiliary device and the connection supporting member 93.

Figure 18:
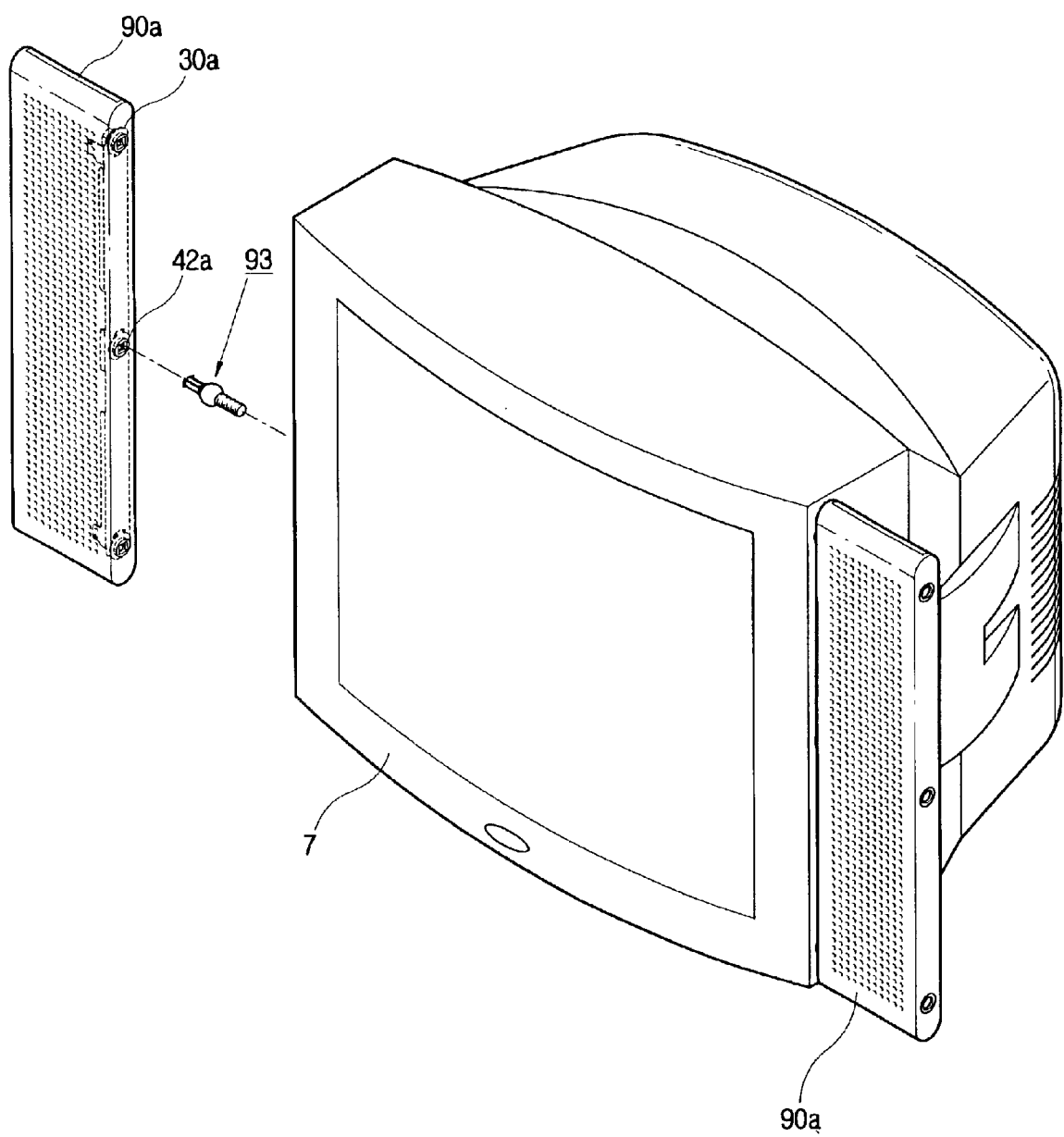
FIG. 18 is a perspective view of an electronic appliances and devices employing a coupling device according to a fourth embodiment of the present invention.

In the above-described embodiment, a separate auxiliary device, for example, an LCD panel or a loudspeaker, etc., is fixed to the monitor body 10 of the LCD panel. However, as illustrated in FIG. 18, the auxiliary device 90 can be applied detachably combining a displaying apparatus in a different type of mounting configuration or a main body of an electronic device 7 in a different kind of mounting configuration. In this case, the above-described bracket members 30, 30a are provided on both side walls of the main body 7 as predetermined and the auxiliary device 90a, respectively, and the main body 7 and the auxiliary device 90a are interconnected by the connection supporting member 93.

Thus, according to the present invention a displaying apparatus that can be easily changed to (from) a wall-mounted type displaying apparatus from (to) a table-mounted type displaying apparatus, thereby increasing convenience to users is provided.

Further, a displaying apparatus in which auxiliary devices can be easily attached to and detached from a monitor body is provided.

According to the present invention a coupling device for electronic appliances in which auxiliary devices can be easily attached to and detached from a predetermined main body is provided.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A displaying apparatus, comprising:
a base member, positioned on an installation surface;
a mounting part connected to the base member; and
a monitor main body, to rotate in clockwise and counterclockwise coaxial directions from a position in which the monitor main body is parallel with the base member, the monitor main body having a plurality of mounting regions to be detachably combined to the mounting part at positions along the monitor main body, which are coaxial with the coaxial rotating directions.

2. A displaying apparatus, comprising:
a base member, positioned on an installation surface, having a first pass hole;
a monitor main body having a plurality of second pass holes, selectively positioned relative to the first pass hole of the base member; and
a rotatable coupling member coupled with the first and selectively one of the second pass holes, thereby rotatably coupling the monitor main body to allow the monitor main body to rotate in clockwise and counterclockwise coaxial directions from a position in which the monitor main body is parallel with the base member.

3. The displaying apparatus according to claim 2, wherein the base member comprises a base part positioned on the installation surface and a pair of stand parts standing up on opposite sides of the base part and each formed with the first pass hole on one end thereof.

4. The displaying apparatus according to claim 3, wherein a bolt-inserting hole, into which a bolt screw-coupled into the installation surface is inserted, is formed in the base part.

5. A displaying apparatus, comprising:
a base member, positioned on an installation surface, having a first pass hole;
a monitor main body having a plurality of second pass holes, selectively positioned relative to the first pass hole of the base member; and
a rotatable coupling member coupled with the first and selectively one of the second pass holes, thereby rotatably coupling the monitor main body at a predetermined angle relative to the base member at a predetermined angle relative to the base member, wherein arc-shaped elongated holes are formed around each of the second pass holes of the monitor main body, and
wherein the rotatable coupling member comprises:
a rotating member having a first boss, a main body part formed with a female screw provided coaxially with the first boss, and an extension rib, in combination with the main body part and movably disposed within the elongated holes according to rotation of the monitor main body, the rotating member being coupled to said one of the second pass holes, and
a coupling member having a head part, a shaft part formed with a male screw engaged with the female screw of the main body part of the rotating member, being connected with the head part and inserted into the first pass hole, and a second boss provided to move axially to the shaft part, being fitted with the first boss.

6. The displaying apparatus according to claim 5, further comprising:
a disengagement-preventing nut combined with the main body part of the rotating member, thereby preventing the main body part from being disengaged from said one of the second pass holes.

7. The displaying apparatus according to claim 6, wherein a plurality of washers is positioned between the disengagement-preventing nut and the main body part.

8. A displaying apparatus, comprising:
a base member, positioned on an installation surface, having a first pass hole;
a monitor main body having a plurality of second pass holes, selectively positioned relative to the first pass hole of the base member;
a rotatable coupling member coupled with the first and selectively one of the second pass holes, thereby rotatably coupling the monitor main body at a predetermined angle relative to the base member at a predetermined angle relative to the base member; and
a plurality of bracket members detachably combined in opposite side walls of the monitor main body, respectively,
wherein the second pass holes are provided in a direction extending along a length of each of the bracket members at predetermined intervals.

9. The displaying apparatus according to claim 8, wherein a plurality of flanges formed with coupling holes are provided in the bracket member, and
a plurality of screw-coupling parts are provided on the opposite side walls within the monitor main body so as to be screw-coupled with respective coupling holes of the plurality of the flanges.

10. The displaying apparatus according to claim 8, wherein each of the bracket members includes a bracket part having at least a planar surface, on which the plurality of second pass holes are formed in a direction extending along a length on the planar surface at predetermined intervals.

11. A displaying apparatus, comprising:
a base member, positioned on an installation surface, having a first pass hole;
a monitor main body having a plurality of second pass holes, selectively positioned relative to the first pass hole of the base member; and
a rotatable coupling member coupled with the first and selectively one of the second pass holes, thereby rotatably coupling the monitor main body at a predetermined angle relative to the base member, wherein
the base member comprises a base part positioned on the installation surface and a pair of stand parts standing up on opposite sides of the base part and each formed with the first pass hole on one end thereof,
a bolt-inserting hole, into which a bolt screw-coupled into the installation surface is inserted, is formed in the base part, and
a depressed parts depressed from a planar surface of the base part, into which the bolt inserting hole is provided.

12. The displaying apparatus according to claim 11, further comprising
a cover member which is detachably provided into the depressed part.

13. A displaying apparatus, comprising:
a base member, positioned on an installation surface, having a first pass hole;
a monitor main body having a plurality of second pass holes, selectively positioned relative to the first pass hole of the base member; and a rotatable coupling member coupled with the first and selectively one of the second pass holes, thereby rotatably coupling the monitor main body at a predetermined angle relative to the base member, wherein:
the monitor main body includes arc-shaped elongated holes formed in the monitor main body adjacent each of the plurality of second pass holes of the monitor main body; and
the rotatable coupling member includes an extension rib rotationally coupled to the said one of the pass holes, the extension rib movably disposed within the arc-shaped elongated holes according to a rotation of the monitor main body, thereby limiting a rotation of the monitor main body to a predetermined range according to end positions of the arc-shaped elongated holes.

14. A displaying apparatus, comprising:
a base member, positioned on an installation surface, having a first pass hole;
a monitor main body having a plurality of second pass holes, selectively positioned relative to the first pass hole of the base member;
a rotatable coupling member coupled with the first and selectively one of the second pass holes, thereby rotatably coupling the monitor main body at a predetermined angle relative to the base member;
an auxiliary device having a plurality of hook-receiving parts, each axially aligned with and opposing a corresponding one of the plurality of second pass holes of the monitor body; and
a connection support member having a first end and a second end, the first end engagable into a select one of the hook-receiving parts of the auxiliary device and the second end engagable into one of the plurality of second pass holes corresponding to the select one of the hook-receiving parts of the auxiliary device.

15. A displaying apparatus comprising:
a base member;
a monitor body, including a plurality of supporting regions, supported on the base member at one of the plurality of the supporting regions;
an auxiliary device detachably combined to the monitor body at another of the plurality of the supporting regions;
at least one pair of first and second hook-receiving parts, being opposingly positioned on the monitor body and the auxiliary device, respectively; and
a connection support member having free ends, each of which is engagable into the first and second hook-receiving parts, respectively, and supportedly connecting the auxiliary device to the monitor body.

16. The displaying apparatus according to claim 15, wherein the auxiliary device is a loudspeaker or an LCD panel.

17. The displaying apparatus according to claim 15, wherein the connection support member is a rotatable connection and the auxiliary device can be inclined with respect to a front side of the monitor body.

18. A displaying apparatus comprising:
a base member;
a monitor body supported on the base member;
an auxiliary device detachably combined to the monitor body;
at least one pair of first and second hook-receiving parts, being opposingly positioned on the monitor body and the auxiliary device, respectively;

a connection support member having free ends, each of which is engagable into the first and second hook-receiving parts, respectively, and supportedly connecting the auxiliary device to the monitor body; and first and second bracket members detachably combined to the monitor body and the auxiliary device, respectively, wherein the first and second hook-receiving parts are formed in the first and second bracket members, respectively.

19. The displaying apparatus according to claim 18, wherein one of the free ends on one side of the connection supporting member is screw-coupled into the first hook-receiving part of the first bracket member and another free end on another side of the connection supporting member is hook-coupled with the second hook-receiving part of the second bracket member.

20. The displaying apparatus according to claim 19, wherein the connection supporting member comprises first and second unit members which are rotatably coupled.

21. The displaying apparatus according to claim 20, wherein the first and second unit members of the connection support member form a ball joint.

22. The displaying apparatus according to claim 20, further comprising a ball formed on one side of the first unit member, and a ball housing, freely and rotatably supporting the ball, formed on an opposing side of the second unit member.

23. A displaying apparatus comprising:

a base member;

a monitor body supported on the base member;

an auxiliary device detachably combined to the monitor body;

at least one pair of first and second hook-receiving parts, being opposingly positioned on the monitor body and the auxiliary device, respectively;

a connection support member having free ends, each of which is engagable into the first and second hook-receiving parts, respectively, and supportedly connecting the auxiliary device to the monitor body;

one or more other auxiliary devices to be detachably combined to the auxiliary device;

one or more other pairs of hook-receiving parts, each being opposingly positioned on either pairs of respective ones of the other auxiliary devices or one of the other auxiliary devices and the auxiliary device, which is connected to the monitor body; and one or more other connection support members, each having free ends, each of the free ends is engagable into the first and second hook-receiving parts, respectively, and supportedly connecting the one or more other auxiliary devices.

24. A coupling device for electronic appliances including a main body and an auxiliary device coupled to the main body, comprising:

first and second bracket members detachably combined with the main body and the auxiliary device, respectively, formed with first and second hook-receiving parts opposing each other on planar surfaces of the main body and the auxiliary device, respectively; and a connection supporting member having two free ends which are engagable into the first and second hook-receiving parts of the first and second bracket members, respectively, and supportedly connecting the auxiliary device to the main body.

25. A displaying apparatus for installation on an installation surface, comprising:

a base member having a mounting part, the base member being positioned on the installation surface;

a monitor main body including opposite sides, as first and second sides, the first side of the monitor main body having at least two connectable points which correspond to and axially align with at least two connectable points of the second side of the monitor main body; and a plurality of connectors provided at the opposite sides of the monitor main body, respectively, each rotatably connecting the monitor main body to the mounting part, such that the monitor main body is rotatable in clockwise and counterclockwise coaxial directions from a position in which the monitor main body is parallel with the base member, and such that by changing only the plurality of connectors from first corresponding connectable points to second corresponding connectable points, the displaying apparatus maintains a fixed orientation with respect to a surface extending horizontally while changing the orientation of the installation surface with respect to the display apparatus.

26. The displaying apparatus according to claim 25, wherein the displaying apparatus maintains either horizontal or vertical orientation.

27. A coupling device for a displaying apparatus, having a monitor body and an auxiliary device, comprising:

first and second bracket members formed with first and second hook-receiving parts, respectively, and detachably combined to the monitor body and the auxiliary device, respectively, the first and second bracket members being opposingly positioned on the monitor body and an auxiliary device, respectively; and a connection support member having free ends, each of the free ends is engagable into first and second hook-receiving parts, respectively, and supportedly connecting the auxiliary device to the monitor body, and wherein one of the free ends on one side of the connection supporting member is screw-coupled into the first hook-receiving part of the first bracket member and another free end on another side of the connection supporting member is hook-coupled with the second hook-receiving part of the second bracket member.

28. A displaying apparatus, including a base member, comprising:

a monitor body, including a plurality of supporting regions, supported on the base member at one of the supporting regions; and an auxiliary device detachably combined to the monitor body at another of the plurality of the supporting regions, wherein the auxiliary device is detachably combined to the monitor main body via:

at least one pair of first and second receiving parts opposingly positioned on the monitor body and the auxiliary device, respectively, and a connection support member having ends to engage with the first and second receiving parts.

* * * * *

UNITED STATES PATENT AND TRADEMARK OFFICE
CERTIFICATE OF CORRECTION

PATENT NO.    : 6,918,562 B2
DATED         : July 19, 2005
INVENTOR(S)   : You-sub Lee et al.

It is certified that error appears in the above-identified patent and that said Letters Patent is hereby corrected as shown below:

Column 11,
Line 53, replace "parts" with -- part, --.

Signed and Sealed this

Seventeenth Day of January, 2006

JON W. DUDAS
*Director of the United States Patent and Trademark Office*